United States Patent
Klimke et al.

(10) Patent No.: US 9,410,034 B2
(45) Date of Patent: Aug. 9, 2016

(54) HIGH MELT STRENGTH POLYPROPYLENE OF IMPROVED QUALITY

(71) Applicant: Borealis AG, Vienna (AT)

(72) Inventors: Katja Klimke, Linz (AT); Hermann Braun, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/406,661

(22) PCT Filed: Jun. 26, 2013

(86) PCT No.: PCT/EP2013/063400
§ 371 (c)(1),
(2) Date: Dec. 9, 2014

(87) PCT Pub. No.: WO2014/001394
PCT Pub. Date: Jan. 3, 2014

(65) Prior Publication Data
US 2015/0175789 A1  Jun. 25, 2015

(30) Foreign Application Priority Data

Jun. 28, 2012 (EP) .................... 12174070

(51) Int. Cl.
| | | |
|---|---|---|
| C08K 5/00 | (2006.01) | |
| C08L 23/12 | (2006.01) | |
| C08F 110/06 | (2006.01) | |
| C08J 5/18 | (2006.01) | |
| C08F 297/08 | (2006.01) | |
| C08F 10/06 | (2006.01) | |
| C08L 23/10 | (2006.01) | |

(52) U.S. Cl.
CPC ............. *C08L 23/12* (2013.01); *C08F 10/06* (2013.01); *C08F 110/06* (2013.01); *C08F 297/083* (2013.01); *C08J 5/18* (2013.01); *C08L 23/10* (2013.01); *C08J 2323/12* (2013.01); *C08J 2423/12* (2013.01); *C08L 2205/02* (2013.01); *C08L 2205/025* (2013.01)

(58) Field of Classification Search
CPC .... C08L 2205/025; C08L 23/10; C08L 23/02
See application file for complete search history.

(56) References Cited

U.S. PATENT DOCUMENTS

| | | |
|---|---|---|
| 6,225,366 B1 | 5/2001 | Raetzsch et al. |
| 2010/0003489 A1 | 1/2010 | Busch et al. |
| 2010/0047544 A1* | 2/2010 | Busch ............. C08J 5/18 428/220 |
| 2010/0063212 A1 | 3/2010 | Oysaed et al. |

FOREIGN PATENT DOCUMENTS

| | | |
|---|---|---|
| EP | 0 787 750 A2 | 8/1997 |
| EP | 0 879 830 A1 | 11/1998 |
| EP | 0 879 844 A1 | 11/1998 |
| EP | 0 890 612 A2 | 1/1999 |
| EP | 1 059 332 A1 | 12/2000 |
| EP | 1 295 910 A1 | 3/2003 |
| EP | 1 892 264 A1 | 2/2008 |
| EP | 1 894 715 A1 | 3/2008 |
| EP | 1 894 716 A1 | 3/2008 |
| EP | 2 000 504 A1 | 12/2008 |
| EP | 2 133 389 A1 | 12/2009 |
| EP | 2 338 930 A1 | 6/2011 |
| EP | 2 386 601 A1 | 11/2011 |
| JP | H07-138378 A | 5/1995 |
| JP | 2002-173564 A | 6/2002 |
| JP | 2003-502468 A | 1/2003 |
| JP | 2003-292659 A | 10/2003 |
| JP | 2007-211184 A | 8/2007 |
| JP | 2009-256460 A | 11/2009 |
| JP | 2010-501382 A | 1/2010 |
| JP | 2010-501712 A | 1/2010 |
| KR | 10-2009-0054970 A | 6/2009 |
| WO | 2008022802 A1 | 2/2008 |
| WO | 2011141070 A1 | 11/2011 |

OTHER PUBLICATIONS

"Polypropylene Handbook", 2nd Edition, Pasquini, Nello (Ed.), Hanser (2005).
Baumgärtel, M. Winter, H.H., "Determination of the Discrete Relaxation and Retardation Time Spectra from Dynamic Mechanical Data", Rheol.Acta 28:511519 (1989).
"Rheotens—Mastercurves and Drawability of Polymer Melts", Wagner, M.H., Polymer Engineering and Science, vol. 36, pp. 925-935 (1996).
International Search Report for International Application No. PCT/EP2013/063400, Issued Jan. 8, 2013.
"Rheotens—Mastercurves and Drawability of Polymer Melts", Wagner, M.N., Polymer Engineering and Science, vol. 36, pp. 925-935 (1996).
Borealis, Daploy™ HMS Polypropylene for Foam Extrusion (2007).

* cited by examiner

*Primary Examiner* — Wenwen Cai
(74) *Attorney, Agent, or Firm* — Warn Partners, P.C.

(57) ABSTRACT

Use of an additive mixture containing a linear polypropylene and at least one additive in a polypropylene composition comprising said additive mixture and a branched polypropylene to reduce the gel index of said polypropylene composition.

20 Claims, No Drawings

HIGH MELT STRENGTH POLYPROPYLENE OF IMPROVED QUALITY

CROSS REFERENCE TO RELATED APPLICATIONS

This application is a National Stage of International Application No. PCT/EP2013/063400, filed Jun. 26, 2013. This application claims priority to European Patent Application No. 12174070.8 filed on Jun. 28, 2012. The disclosure of the above applications are incorporated herein by reference.

The present invention relates to a method of providing a polypropylene composition having high melt strength and a low OCS gel index. Furthermore, the present invention also relates to a corresponding high melt strength (HMS) polypropylene composition as well as to the use of a specific linear polypropylene to reduce the OCS gel index of a polypropylene composition.

High melt strength polypropylene (HMS-PP) compositions are generally known in the art. However, one challenge within existing HMS-PP is their varying film quality. The film quality is expressed via the gel index which is measured with the OCS gel inspection tool as described in WO 2008/022802.

As known in the art, additives are normally added to plastic materials in order to improve the performance thereof. Examples of typical additives are e.g. antioxidants or pigments etc. These additives are often added to the plastic base material in the form of an additive mixture having incorporated the additives into a small amount of polymer powder. The additive mixture is sometimes also referred to as masterbatch. The small quantity of polymer powder used for the additive mixture is normally dosed at the end of the HMS process. However, the contribution to the final gel index of this additive mixture is often overlooked. And so far it was thought that the gel index and therefore the film quality of the resulting material is dependent only on the manufacture of the high melt strength polypropylene rather than on the properties of the masterbatch.

EP 0 879 830, filed by Borealis in 1997, describes the basics of the Borealis high melt strength (HMS) post-reactor process where peroxide and butadiene are used to make long chain branched polypropylene (LCB-PP) materials. This patent covers a wide range of powder melt flow rates (MFRs) and particle sizes. However, it does not specify the impact of the PP powder used for the preparation of the additive mixture on the HMS quality in particular on the OCS film quality expressed via the gel index.

There remains a need in the art for a method to produce HMS-PP of reliable and/or improved quality.

Accordingly the object of the present invention is to provide a process which enables a skilled person to produce polypropylene composition and a film made of said polypropylene composition with low gel content.

The present inventors now surprisingly found that the final gel index is actually independent of the powder particle size and PSD used for the additive mixture. Rather, it was found that the final gel index can be significantly reduced simply by increasing the MFR of the powder used for the additive mixture.

Thus, the present invention relates to a process for providing a polypropylene composition having high melt strength, the process comprises the steps of:
(a) providing a branched polypropylene (b-PP) having a $F_{30}$ melt strength of more than 5.5 cN and a $v_{30}$ melt extensibility of more than 200 mm/s, wherein the $F_{30}$ melt strength and the $v_{30}$ melt extensibility are measured according to ISO 16790:2005;
(b) adding to the branched polypropylene (b-PP) a polypropylene (PP'), preferably a linear polypropylene (l-PP), having a melt flow rate $MFR_2$ (230° C.) of 1 to 18 g/10 min.

The present invention further provides a polypropylene composition comprising
(a) 95 to 99 parts by weight of a branched polypropylene (b-PP); and
(b) 1 to 5 parts by weight of a linear polypropylene (l-PP) having a melt flow rate $MFR_2$ (230° C.) measured according to ISO 1133 of 1 to 18 g/10 min, preferably from 3 to 15 g/10 min;
wherein the polypropylene composition has
a melt flow rate $MFR_2$ (230° C.) measured according to ISO 1133 of 8 to 12 g/10 min, and
a gel index of less than 1,500;
and wherein further the polypropylene composition and/or the branched polypropylene (b-PP) has/have a $F_{30}$ melt strength of more than 5.5 cN, preferably of 5.8 to 13.0 cN, and a $v_{30}$ melt extensibility of more than 200 mm/s, preferably of 230 to 290 mm/s, wherein the $F_{30}$ melt strength and the $v_{30}$ melt extensibility are measured according to ISO 16790:2005.

The present invention still further provides a polypropylene composition comprising
(a) 95 to 99 parts by weight of a branched polypropylene (b-PP); and
(b) 1 to 5 parts by weight of a linear polypropylene (l-PP) having a melt flow rate $MFR_2$ (230° C.) measured according to ISO 1133 of 1 to 18 g/10 min, preferably from 3 to 15 g/10 min;
wherein the polypropylene composition has
a melt flow rate $MFR_2$ (230° C.) measured according to ISO 1133 of 4 to below 8 g/10 min, preferably of 5 to below 7 g/10 min, and
a gel index of less than 1,300, preferably less than 1000;
and wherein further the polypropylene composition and/or the branched polypropylene (b-PP) has/have a $F_{30}$ melt strength of more than 5.5 cN, preferably of more than 6.0 to 13.0 cN, and a $v_{30}$ melt extensibility of more than 200 mm/s, preferably of 230 to 290 mm/s, wherein the $F_{30}$ melt strength and the $v_{30}$ melt extensibility are measured according to ISO 16790:2005.

The present invention also features a film comprising a corresponding polypropylene composition as described above.

Furthermore, the present invention relates to the use of an additive mixture (AM) containing a linear polypropylene (l-PP) and at least one additive (A) in a polypropylene composition comprising said additive mixture (AM) and a branched polypropylene (b-PP) to reduce the gel index of said polypropylene composition or films made from said polypropylene composition, wherein
(a) the polypropylene composition and/or the branched polypropylene (b-PP) has/have a $F_{30}$ melt strength of more than 5.5 cN and a $v_{30}$ melt extensibility of more than 200 mm/s, wherein the $F_{30}$ melt strength and the $v_{30}$ melt extensibility are measured according to ISO 16790:2005;
(b) the linear polypropylene (l-PP) has a melt flow rate $MFR_2$ (230° C.) measured according to ISO 1133 of 1 to 18 g/10 min; and
(c) the at least one additive (A) is selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof.

In the following the invention is described in more detail.

First the individual components used, i.e. the branched polypropylene (b-PP), the polypropylene (PP'), like the linear polypropylene (l-PP), and the additives (A), used in the instant invention as well as the polypropylene composition are described. Subsequently the process as well as the inventive use is described in more detail. However any information or any preferred embodiment provided for the individual components or the polypropylene composition is also applicable for the inventive process and use, if reference is made to the individual components and the polypropylene composition, respectively.

The major component for the polypropylene composition to be provided according to the invention is a branched polypropylene (b-PP). A branched polypropylene differs from a linear polypropylene that the polypropylene backbone covers side chains whereas a non-branched polypropylene, i.e. a linear polypropylene, does not cover side chains. The side chains have significant impact on the rheology of the polypropylene. Accordingly linear polypropylenes and branched polypropylenes can be clearly distinguished by its flow behavior under stress.

Branching can be achieved by using specific catalysts, i.e. specific single-site catalysts, or by chemical modification. Concerning the preparation of a branched polypropylene obtained by the use of a specific catalyst reference is made to EP 1 892 264. With regard to a branched polypropylene obtained by chemical modification it is referred to EP 0 879 830 A1. In such a case the branched polypropylene is also called high melt strength polypropylene. Preferably the branched polypropylene (b-PP) of the instant invention is obtained by chemical modification as described in more detail below and thus is a high melt strength polypropylene (HMS-PP).

Therefore the branched polypropylene (b-PP), preferably the high melt strength polypropylene (HMS-PP), as the major component of the polypropylene composition has a $F_{30}$ melt strength of more than 5.5 cN and a $v_{30}$ melt extensibility of more than 200 mm/s, preferably has a $F_{30}$ melt strength of more than 5.5 to 20.0 cN and a $v_{30}$ melt extensibility of more than 200 to 300 mm/s, in order to provide a resulting polypropylene composition with good shear thinning properties. The $F_{30}$ melt strength and the $v_{30}$ melt extensibility are measured according to ISO 16790:2005.

Typically the instant polypropylene composition also has a $F_{30}$ melt strength of more than 5.5 cN and a $v_{30}$ melt extensibility of more than 200 mm/s, preferably has a $F_{30}$ melt strength of more than 5.5 to 20.0 cN and a $v_{30}$ melt extensibility of more than 200 to 300 mm/s.

In a preferred embodiment, the branched polypropylene (b-PP), preferably the high melt strength polypropylene (HMS-PP), has (a) a $F_{30}$ melt strength of more than 5.6 cN, like of more than 5.6 to 20.0 cN, more preferably of more than 5.7 cN, still more preferably of 5.7 to 18.0 cN, yet more preferably of 5.7 to 15.0 cN, still yet more preferably of 5.8 to 13.0 cN, and (b) a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s.

In especially preferred embodiment the branched polypropylene (b-PP), preferably the high melt strength polypropylene (HMS-PP), has a $F_{30}$ melt strength of more than 5.6 cN and a $v_{30}$ melt extensibility of more than 210 to 300 mm/s, like a $F_{30}$ melt strength of more than 5.6 to 20.0 cN and $v_{30}$ melt extensibility of more than 220 to 300 mm/s, more preferably a $F_{30}$ melt strength of more than 5.7 cN and $v_{30}$ melt extensibility of more than 225 mm/s, still more preferably a $F_{30}$ melt strength of 5.7 to 18.0 cN and $v_{30}$ melt extensibility of 225 to 300 mm/s, yet more preferably a $F_{30}$ melt strength of 5.7 to 15.0 cN and $v_{30}$ melt extensibility of 230 to 290 mm/s, still yet more preferably a $F_{30}$ melt strength of 5.8 to 12.0 cN and $v_{30}$ melt extensibility of 230 to 290 mm/s.

Additionally or alternatively to the branching index the branched polypropylene (b-PP), preferably the high melt strength polypropylene (HMS-PP), can be further defined by the strain hardening factor (SHF). Accordingly it is preferred that the branched polypropylene (b-PP), preferably the high melt strength polypropylene (HMS-PP), has a strain hardening factor (SHF) of at least 1.7, more preferably of at least 1.9, yet more preferably in the range of 1.9 to 7.0, still more preferably in the range of 1.9 to 6.5 measured at a strain rate of $3.0\ s^{-1}$ and a Hencky strain of 2.5.

Further it is preferred that said branched polypropylene (b-PP), preferably the high melt strength polypropylene (HMS-PP), has a melt flow rate $MFR_2$ (230° C.) measured according to ISO 1133 of at least 2.0 g/10 min, more preferably in a range of 2.0 to 40.0 g/10 min, still more preferably in a range of 4.0 to 30.0 g/10 min, yet more preferably in a range of 5.0 to 20.0 g/10 min, like in the range of 7.0 to 13.0 g/10 min, like 8.0 to 12.0 g/10 min.

Hence in one specific embodiment, the branched polypropylene (b-PP), preferably the high melt strength polypropylene (HMS-PP), has (a) a melt flow rate $MFR_2$ (230° C.) of at least 2.0 g/10 min, preferably in a range of 2.0 to 40.0 g/10 min, more preferably in a range of 4.0 to 30.0 g/10 min, still more preferably in a range of 5.0 to 20.0 g/10 min, yet more preferably in the range of 7.0 to 13.0 g/10 min, like 8.0 to 12.0 g/10 min;

(b) a $F_{30}$ melt strength of more than 5.6 cN, like of more than 5.6 to 20.0 cN, more preferably of more than 5.7 cN, still more preferably of 5.7 to 18.0 cN, yet more preferably of 5.7 to 15.0 cN, still yet more preferably of 5.8 to 13.0 cN, and (c) a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s.

Preferably, the branched polypropylene (b-PP), preferably the high melt strength polypropylene (HMS-PP), has a melting point of at least 130° C., more preferably of at least 135° C. and most preferably of at least 140° C. The crystallization temperature is preferably at least 120° C.

Further, the branched polypropylene (b-PP), preferably the high melt strength polypropylene (HMS-PP), can be a branched random propylene copolymer (b-R-PP), preferably high melt strength random propylene copolymer (R-HMS-PP), or a branched propylene homopolymer (b-H-PP), preferably a high melt strength propylene homopolymer (H-HMS-PP), the latter being preferred.

For the purpose of the present invention, the expression "propylene homopolymer" refers to a polypropylene that consists substantially, i.e. of at least 97 mol.-%, preferably of at least 98 mol.-%, more preferably of at least 99 mol.-%, most preferably of at least 99.8 mol.-% of propylene units. In a preferred embodiment only propylene units in the propylene homopolymer are detectable.

In case the branched polypropylene (b-PP), preferably the high melt strength polypropylene (HMS-PP), is a branched random propylene copolymer (b-R-PP), preferably a high melt strength random propylene copolymer (R-HMS-PP), it comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the branched random propylene copolymer (b-R-PP), preferably the high melt strength random propylene copolymer (R-HMS-PP), comprises, especially consists of, monomers copolymerizable with propylene from the group consisting of ethylene, 1-butene and 1-hexene. More specifically the branched random propylene copolymer (b-R-PP), preferably the high melt strength random propylene copolymer (R-HMS-PP), comprises—apart from propylene—units derivable from ethylene and/or 1-butene. In a preferred embodiment the branched random propylene copolymer (b-R-PP), preferably the high melt strength random propylene copolymer (R-HMS-PP), comprises units derivable from ethylene and propylene only. The comonomer content in the branched random propylene copolymer (b-R-PP), preferably in the high melt strength random propylene copolymer (R-HMS-PP), is preferably in the range of more than 0.2 to 10.0 mol.-%, still more preferably in the range of more than 0.5 to 7.0 mol.-%.

In this regard it is to mention that the high melt strength polypropylene (HMS-PP) being either a high melt strength propylene homopolymer (H-HMS-PP) or a high melt strength random propylene copolymer (R-HMS-PP) may comprise additionally unsaturated monomers different to the comonomers defined for the high melt strength random propylene copolymer (R-HMS-PP). In other words the high melt strength propylene homopolymer (H-HMS-PP) or the high melt strength random propylene copolymer (R-HMS-PP) may comprise unsaturated monomers, like bifunctionally unsaturated monomer(s) and/or multifunctionally unsaturated low molecular weight polymer(s) as defined in detail below, being different to propylene, ethylene and other $C_4$ to $C_{12}$ α-olefins. Accordingly the definition of homopolymer and copolymer in view of the high melt strength polypropylene (HMS-PP) refers actually to the unmodified polypropylene used to obtain the melt strength polypropylene (HMS-PP) by chemical modification as defined in detail below.

As mentioned, the branched polypropylene (b-PP), when used in the form of a high melt strength polypropylene (HMS-PP) is a modified polypropylene. Accordingly the high melt strength polypropylene (HMS-PP) can be further defined by the way obtained. The high melt strength polypropylene (HMS-PP) is preferably the result of treating an unmodified polypropylene with thermally decomposing radical-forming agents and/or with ionizing radiation. However in such a case a high risk exists that the unmodified polypropylene is degraded, which is detrimental. Thus it is preferred that the modification is accomplished by the use of bifunctionally unsaturated monomer(s) and/or multifunctionally unsaturated low molecular weight polymer(s) as chemically bound bridging unit(s). A suitable method to obtain the high melt strength polypropylene (HMS-PP) is for instance disclosed in EP 0 787 750, EP 0 879 830 A1 and EP 0 890 612 A2. All documents are herewith included by reference. Thereby, the amount of peroxide is preferably in the range of 0.05 to 3.00 wt.-% based on the unmodified polypropylene.

Accordingly in one preferred embodiment the high melt strength polypropylene (HMS-PP) comprises
(a) if it is a high melt strength propylene homopolymer (H-HMS-PP) units derived from
(i) propylene and
(ii) bifunctionally unsaturated monomer(s) and/or multifunctionally unsaturated low molecular weight polymer(s), or
(b) if it is a high melt strength random propylene copolymer (R-HMS-PP) units derived from
(i) propylene
(ii) ethylene and/or $C_4$ to $C_{10}$ α-olefins, e.g. 1-butene and/or 1-hexene, preferably erthylene, and
(iii) bifunctionally unsaturated monomer(s) and/or multifunctionally unsaturated low molecular weight polymer(s), "Bifunctionally unsaturated or multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals. The unsaturated sites in the bi- or multifunctionally unsaturated compounds are in their chemically bound state not actually "unsaturated", because the double bonds are each used for a covalent bond to the polymer chains of the unmodified polypropylene.

Reaction of the bifunctionally unsaturated monomer(s) and/or multifunctionally unsaturated low molecular weight polymer(s), preferably having a number average molecular weight $(M_n)\leq 10000$ g/mol, synthesized from one and/or more unsaturated monomers with the unmodified polypropylene may be performed in the presence of a thermally free radical forming agent, e.g. decomposing free radical-forming agent, like a thermally decomposable peroxide and/or ionizing radiation or microwave radiation.

The bifunctionally unsaturated monomers may be
divinyl compounds, such as divinylaniline, m-divinylbenzene, p-divinylbenzene, divinylpentane and divinylpropane;
allyl compounds, such as allyl acrylate, allyl methacrylate, allyl methyl maleate and allyl vinyl ether;
dienes, such as 1,3-butadiene, chloroprene, cyclohexadiene, cyclopentadiene, 2,3-dimethylbutadiene, heptadiene, hexadiene, isoprene and 1,4-pentadiene;
aromatic and/or aliphatic bis (maleimide) bis (citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight $(M_a)\leq 10000$ g/mol may be synthesized from one or more unsaturated monomers.

Examples of such low molecular weight polymers are
polybutadienes, especially where the different microstructures in the polymer chain, i.e. 1,4-cis, 1,4-trans and 1,2-(vinyl) are predominantly in the 1,2-(vinyl) configuration
copolymers of butadiene and styrene having 1,2-(vinyl) in the polymer chain.

A preferred low molecular weight polymer is polybutadiene, in particular a polybutadiene having more than 50.0 wt.-% of the butadiene in the 1,2-(vinyl) configuration.

The high melt strength polypropylene (HMS-PP) may contain more than one bifunctionally unsaturated monomer and/or multifunctionally unsaturated low molecular weight polymer. Even more preferred the amount of bifunctionally unsaturated monomer(s) and multifunctionally unsaturated low molecular weight polymer(s) together in the high melt strength polypropylene (HMS-PP) 0.01 to 10.0 wt.-% based on said high melt strength polypropylene (HMS-PP).

As stated above it is preferred that the bifunctionally unsaturated monomer(s) and/or multifunctionally unsaturated low molecular weight polymer(s) are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:

Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Also contemplated are mixtures of these above listed free radical-forming agents.

The unmodified polypropylene to prepare such a high melt strength polypropylene (HMS-PP) has preferably a melt flow rate $MFR_2$ (230° C.) measured according to ISO 1133 in a range of 0.05 to 45.0 g/10 min, more preferably in a range of 0.01 to 10.0 g/10 min, still more preferably in a range of 0.01 to 1.0 g/10 min, yet more preferably in a range of 0.01 to 0.5 g/10 min.

Preferably the unmodified polypropylene is a propylene homopolymer.

After the preparation the high melt strength polypropylene (HMS-PP) may be subjected to modification steps to further modify the polymer. Such modification steps include, for instance, grafting, where one or more functional comonomers are grafted to the polypropylene chain; and visbreaking, where the molecular weight of the polypropylene is reduced by combining the polymer in molten state in the extruder with a free radical generator, such as a peroxide. Such steps are well known to the person skilled in the art and references to them may be found in the literature.

The branched polypropylene (b-PP), preferably the high melt strength polypropylene (HMS-PP), is free of additives (A) as defined in more detail below.

The other important component of the present invention is the polypropylene (PP'), preferably a linear polypropylene (l-PP), which must have a melt flow rate $MFR_2$ (230° C.) measured according to ISO 1133 of 1 to 18 g/10 min, preferably of 3 to 15 g/10 min, more preferably of 4 to 15 g/10 min, yet more preferably of 5 to 13 g/10 min.

As mentioned above the term "linear" indicates that the linear polypropylene (l-PP), shows no or nearby no-branching structure. Due to the absence of branches, the linear polypropylene (l-PP) is preferably featured by a low a $v_{30}$ melt extensibility and/or a low $F_{30}$ melt strength. Thus it is preferred that the linear polypropylene (l-PP) has (a) a $F_{30}$ melt strength of more than 1.0 cN, preferably of more than 2.0 cN, more preferably in the range of 1.0 to 65 cN, yet more preferably in the range of 2.0 to 50 cN, like in the range of 2.5 to 30 cN;

and (b) a $v_{30}$ melt extensibility of below 200 mm/s, preferably of below 190 mm/s, more preferably in the range of 100 to below 200 mm/s, still more preferably in the range of 120 to 190 mm/s, yet more preferably in the range of 120 to 175 mm/s, like in the range of 125 to 170 mm/s.

In other words it is preferred that the linear polypropylene (l-PP) has a $F_{30}$ melt strength of more than 1.0 cN and a $v_{30}$ melt extensibility of below 200 mm/s, preferably a $F_{30}$ melt strength of more than 2.0 cN and a $v_{30}$ melt extensibility of below 190 mm/s, more preferably a $F_{30}$ melt strength in the range of 1.0 to 65 cN and a $v_{30}$ melt extensibility in the range of 100 to below 200 mm/s, yet more preferably a $F_{30}$ melt strength in the range of 2.0 to 50 cN and in the range of 120 to 190 mm/s, like a $F_{30}$ melt strength in the range of 2.5 to 30 cN and a $v_{30}$ melt extensibility in the range of 120 to 175 mm/s.

Accordingly in one specific embodiment the linear polypropylene (l-PP) has (a) a melt flow rate $MFR_2$ (230° C.) of 1 to 18 g/10 min, preferably of 3 to 15 g/10 min, more preferably of 4 to 15 g/10 min, yet more preferably of 5 to 13 g/10 min;

(b) a $F_{30}$ melt strength of more than 1.0 cN, preferably of more than 2.0 cN, more preferably in the range of 1.0 to 65 cN, yet more preferably in the range of 2.0 to 50 cN, like in the range of 2.5 to 30 cN; and (c) a $v_{30}$ melt extensibility of below 200 mm/s, preferably of below 190 mm/s, more preferably in the range of 100 to below 200 mm/s, still more preferably in the range of 120 to 190 mm/s, yet more preferably in the range of 120 to 175 mm/s, like in the range of 125 to 170 mm/s.

The linear polypropylene (l-PP) can be produced in a known manner by employing a single-site or a Ziegler Natta catalyst. The linear polypropylene (l-PP) can be a linear propylene homopolymer (l-H-PP) or a linear propylene copolymer (l-R-PP). Concerning the comonomer content and type of comonomer it is referred to the information provided above for the branched polypropylene (b-PP). Preferably the linear polypropylene (l-PP) is a linear propylene homopolymer (l-H-PP).

As mentioned above the major component of the polypropylene composition is the branched polypropylene (b-PP) whereas the linear polypropylene is present in lower amounts.

Accordingly it is preferred that the polypropylene composition comprises (a) 80 to 99 parts by weight, preferably 90 to 99 parts by weight, more preferably 95 to 99 parts by weight, of the branched polypropylene (b-PP), preferably of the high melt strength polypropylene (HMS-PP); and (b) 1 to 20 parts by weight, preferably 1 to 10 parts by weight, more preferably 1 to 5 parts by weight, of polypropylene (PP'), preferably of the linear polypropylene (l-PP).

In a preferred embodiment the branched polypropylene (b-PP), i.e. the high melt strength polypropylene (HMS-PP), and the polypropylene (PP'), i.e. the linear polypropylene (l-PP), are the only polymer components in the polypropylene composition. In other words the polypropylene composition may comprise further at least one additive (A) as defined in more detail below but no other polymers in an amount exceeding 5 wt.-%, more preferably exceeding 2 wt.-%, still more preferably exceeding 1 wt.-%, based on the total weight of the polypropylene composition. In a specific embodiment polypropylene composition consists of the branched polypropylene (b-PP), preferably the high melt strength polypropylene (HMS-PP), the polypropylene (PP'), preferably the linear polypropylene (l-PP), and at least one additive (A).

Illustrative additives (A) to be used in polypropylene composition of the invention include, but are not limited to, stabilizers such as antioxidants (e.g. sterically hindered phenols, phosphites/phosphonites, sulphur containing antioxidants, alkyl radikyl scavangers, aromatic amines, hindered amine stabilizers, or blends thereof), metal deactivators (e.g. Irganox MD 1024), or UV stabilizers (e.g. hindered amine light stabilizers). Other typical additives are modifiers such as antistatic or antifogging agents (e.g. ethoxylated amines and amides, or glycerol esters), acid scavengers (e.g. Ca-stearate), blowing agents, cling agents (e.g. polyisobutene), lubricants and resins (ionomer waxes, PE- and ethylene copolymer waxes, Fischer-Tropsch waxes, Montan-based waxes, Fluoro-based compounds, or paraffin waxes), nucleating agents (e.g. talc, benzoates, phosphorous-based compounds, sorbitoles, nonitol-based compounds, or amide-based compounds), as well as slip and antiblocking agents (e.g. erucamide, oleamide, talc natural silica and synthetic silica, or zeolites). Preferably the additives (A) are selected from the group consisting of antioxidants (e.g. sterically hindered phenols, phosphites/phosphonites, sulphur containing antioxidants, alkyl radikyl scavangers, aromatic amines, hindered amine stabilizers, or blends thereof), metal deactivators (e.g. Irganox MD 1024), or UV stabilizers (e.g. hindered amine light stabilizers), antistatic or antifogging agents (e.g. ethoxylated amines and amides, or glycerol esters), acid scavengers (e.g. Ca-stearate), blowing agents, cling agents (e.g. polyisobutene), lubricants and resins (ionomer waxes, PE- and ethylene copolymer waxes, Fischer-Tropsch waxes, Montan-based waxes, Fluoro-based compounds, or paraffin waxes), nucleating agents (e.g. talc, benzoates, phosphorous-based compounds, sorbitoles, nonitol-based compounds, or amide-based compounds), slip agents, antiblocking agents (e.g. erucamide, oleamide, talc natural silica and synthetic silica, or zeolites) and mixtures thereof.

Preferably the total amount of additives (A) in the polypropylene composition is not more 5 wt.-%, more preferably not more than 1 wt.-%, like in the range of 0.005 to 0.5 wt.-%, based on the total weight of the polypropylene composition. Preferably the additives (A) are introduced in the instant polypropylene composition in the form of an additive mixture (AM). The additive mixture (AM) comprises, preferably consists of, the polypropylene (PP'), preferably the linear polypropylene (l-PP), and the additives (A). Typically the total amount of additives in the additive mixture (AM) is not more than 25 wt.-%, more preferably not more than 20 wt.-%, like in the range of 5 to 20 wt.-% based on the total weight of the additive mixture (AM).

As mentioned above the branched polypropylene (b-PP), i.e. preferably the high melt strength polypropylene (HMS-PP), is the dominant part in the instant polypropylene composition. Accordingly it is preferred that the final polypropylene composition shows a similar rheology behavior as the branched polypropylene (b-PP), i.e. preferably the high melt strength polypropylene (HMS-PP).

Thus the instant polypropylene composition has
(a) a $F_{30}$ melt strength of more than 5.6 cN, like of more than 5.6 to 20.0 cN, more preferably of more than 5.7 cN, still more preferably of 5.7 to 18.0 cN, yet more preferably of 5.7 to 15.0 cN, still yet more preferably of 5.8 to 13.0 cN,
and
(b) a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s.

In a preferred embodiment the instant polypropylene composition has a $F_{30}$ melt strength of more than 5.6 cN and a $v_{30}$ melt extensibility of more than 210 to 300 mm/s, like a $F_{30}$ melt strength of more than 5.6 to 20.0 cN and $v_{30}$ melt extensibility of more than 220 to 300 mm/s, more preferably a $F_{30}$ melt strength of more than 5.7 cN and $v_{30}$ melt extensibility of more than 225 mm/s, still more preferably a $F_{30}$ melt strength of 5.7 to 18.0 cN and $v_{30}$ melt extensibility of 225 to 300 mm/s, yet more preferably a $F_{30}$ melt strength of 5.7 to 15.0 cN and $v_{30}$ melt extensibility of 230 to 290 mm/s, still yet more preferably a $F_{30}$ melt strength of 5.8 to 12.0 cN and $v_{30}$ melt extensibility of 230 to 290 mm/s.

Additionally or alternatively to the branching index the instant polypropylene composition, can be further defined by the strain hardening factor (SHF). Accordingly it is preferred that the instant polypropylene composition has a strain hardening factor (SHF) of at least 1.7, more preferably of at least 1.9, yet more preferably in the range of 1.9 to 7.0, still more preferably in the range of 1.9 to 6.5 measured at a strain rate of $3.0\ s^{-1}$ and a Hencky strain of 2.5.

Essential finding of the present invention is that the instant polypropylene composition and thus films made from said polypropylene composition (especially as defined below) show a reduced OCS gel index. Accordingly it is preferred that the instant polypropylene composition has OCS gel index of less than 1,500, preferably of less than 1,000, more preferably in the range of 100 to 1,500, yet more preferably in the range of 150 to 1,000, still more preferably in the range of 200 to 800.

Preferably the instant polypropylene composition has a melt flow rate $MFR_2$ (230° C.) measured according to ISO 1133 of at least 2.0 g/10 min, preferably in a range of 2.0 to 40.0 g/10 min, more preferably in a range of 4.0 to 30.0 g/10 min, still more preferably in a range of 5.0 to 20.0 g/10 min, yet more preferably in the range of 7.0 to 13.0 g/10 min, like 8.0 to 12.0 g/10 min.

Accordingly in a specific embodiment the instant polypropylene composition has
(a) a melt flow rate $MFR_2$ (230° C.) of at least 2.0 g/10 min, preferably in a range of 2.0 to 40.0 g/10 min, more preferably in a range of 4.0 to 30.0 g/10 min, still more preferably in a range of 5.0 to 20.0 g/10 min, yet more preferably in the range of 7.0 to 13.0 g/10 min, like 8.0 to 12.0 g/10 min;
(b) a $F_{30}$ melt strength of more than 5.6 cN, like of more than 5.6 to 20.0 cN, more preferably of more than 5.7 cN, still more preferably of 5.7 to 18.0 cN, yet more preferably of 5.7 to 15.0 cN, still yet more preferably of 5.8 to 13.0 cN; and
(c) a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s.

Keeping the information provide above in mind the present invention for instance covers a polypropylene composition comprising (a) 80 to 99 parts by weight, preferably 90 to 99 parts by weight, more preferably 95 to 99 parts by weight, of the branched polypropylene (b-PP), preferably of the high melt strength polypropylene (HMS-PP);

(b) 1 to 20 parts by weight, preferably 1 to 10 parts by weight, more preferably 1 to 5 parts by weight, of polypropylene (PP'), preferably of the linear polypropylene (l-PP), having a melt flow rate $MFR_2$ (230° C.) measured according to ISO 1133 of 1 to 18 g/10 min, preferably of 3 to 15 g/10 min, more preferably of 4 to 15 g/10 min, yet more preferably of 5 to 13 g/10 min; and (c) optionally 0.005 to 5, preferably 0.005 to 2, more preferably 0.05 to 1, like 0.05 to 0.5, parts by weight of additives (A), wherein said additives (A) are selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof;

wherein the polypropylene composition has a melt flow rate $MFR_2$ (230° C.) of at least 2.0 g/10 min, preferably in a range of 2.0 to 40.0 g/10 min, more preferably in a range of 4.0 to 30.0 g/10 min, still more preferably in a range of 5.0 to 20.0 g/10 min, yet more preferably in the range of 7.0 to 13.0 g/10 min, like 8.0 to 12.0 g/10 min; and a gel index of less than 1,500 preferably of less than 1,000, more preferably in the range of 100 to 1,500, yet more preferably in the range of 150 to 1,000, still more preferably in the range of 200 to 800;

and wherein the polypropylene composition and/or the branched polypropylene (b-PP) has/have a $F_{30}$ melt strength of more than 5.6 cN, like of more than 5.6 to 20.0 cN, more preferably of more than 5.7 cN, still more preferably of 5.7 to 18.0 cN, yet more preferably of 5.7 to 15.0 cN, still yet more preferably of 5.8 to 13.0 cN, and a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s.

As mentioned above, the present invention also features a film comprising the instant polypropylene composition described herein. Preferably the film is a cast film or a blown film. The film may also a biaxially oriented blown film. The differences between such films are known to the skilled person. Reference is made in this regard to the "Polypropylene Handbook", $2^{nd}$ Edition, Nello Pasquini (Ed.), Hanser. Preferably the film comprises at least 70 wt.-%, more preferably at least 80 wt.-%, more preferably at least 90 wt.-%, yet more preferably at least 95 wt.-%, of the instant invention. In a preferred embodiment the film consists of the instant polypropylene composition.

Preferably the instant film has OCS gel index of less than 1,500, preferably of less than 1,000, more preferably in the range of 100 to 1,500, yet more preferably in the range of 150 to 1,000, still more preferably in the range of 200 to 800.

The instant process for the manufacture of the polypropylene composition comprises the providing of the branched polypropylene (b-PP) (step (a)), followed by the adding of the polypropylene (PP'), preferably of the linear polypropylene (l-PP), optionally together with the at least one additive (A) to the branched polypropylene (b-PP) (step (b)). Preferably the polypropylene (PP'), preferably the linear polypropylene (l-PP), and the at least one additive are added to the branched polypropylene (b-PP) in the form of the additive mixture (AM).

Preferably step (b) is initiated when at least 70%, preferably at least 80%, yet more preferably at least 90%, like at least 95 or 99%, of the reaction between the polypropylene (PP) and the thermally decomposing free radical-forming agent and optionally the bifunctionally unsaturated monomer has taken place to obtain the branched polypropylene (b-PP), preferably the high melt strength polypropylene (HMS-PP).

In a preferred embodiment, an extruder, such as a twin screw extruder, is used for adding the polypropylene (PP'), preferably the linear polypropylene (l-PP), to the branched polypropylene (b-PP).

The use of an extruder is particularly advantageous in that it can simultaneously be used for the preparation of the branched propylene (b-PP), preferably the high melt strength polypropylene (HMS-PP). In a preferred embodiment, (unmodified) polypropylene is added to an extruder together with—as described in detail above—a thermally decomposing free radical-forming agent, preferably a peroxide, and optionally a bifunctionally unsaturated monomer, preferably selected from divinyl compounds, allyl compounds or dienes, to provide the branched polypropylene (b-PP), preferably the high melt strength polypropylene (HMS-PP), in a step (a). It is also possible to use a combination of an extruder downstream a pre-mixing device, wherein the bifunctionally unsaturated monomer and the thermally decomposing free radical-forming agent is add to the polypropylene in the pre-mixing device. Subsequently, in a step (b) the polypropylene (PP'), preferably the linear polypropylene (l-PP), or the additive mixture (AM) based on said polypropylene (PP'), preferably on said linear polypropylene (l-PP), comprising the at least one additive (A) is preferably added at the downstream end of the extruder screw in order not to interfere with the modification reaction for providing branched polypropylene (b-PP), preferably the high melt strength polypropylene (HMS-PP), as described above. In this respect, the term "downstream end of the extruder screw" is understood as within the last 60% of the length of the extruder screw, preferably within the last 60% of the length of the extruder screw, more preferably at least 70% of the length of the extruder screw, like at least 75% of the extruder screw.

Accordingly, the extruder (E) used for the instant process preferably comprises in operation direction a feed-throat (FT), a first mixing zone (MZ1), a second mixing zone (MZ2) and a die (D), wherein between the first mixing zone (MZ1) and the second mixing zone (MZ2) a side feed-throat (SFT) is located. Preferably the extruder is a screw extruder, like a twin screw extruder. Accordingly the unmodified polypropylene, the thermally decomposing free radical-forming agent, preferably a peroxide, and optionally the bifunctionally unsaturated monomer and/or the multifunctionally unsaturated low molecular weight polymer monomer, preferably selected from divinyl compounds, allyl compounds or dienes, but not the polypropylene (PP'), i.e. not the linear polypropylene (l-PP), and not the additives (A), are fed via the feed-throat (FT), thereby preferably using a feeder, into the extruder and is/are subsequently passed downstream through the first mixing zone (MZ1). Preferably the shear stress in said first mixing zone (MZ1) is of such extent that the unmodified polypropylene is molten and the chemical reaction with the radical-forming agent and with the optional bifunctionally unsaturated monomer and/or multifunctionally unsaturated low molecular weight polymer is initiated. After the first mixing zone (MZ1), i.e. between the first mixing zone (MZ1) and the second mixing zone (MZ2), the polypropylene (PP'), preferably the linear polypropylene (l-PP), or the additive mixture (AM) is added, i.e. fed into the extruder. Preferably the polypropylene (PP'), preferably the linear polypropylene (l-PP), or the additive mixture (AM) is added via the side feed-throat (SFT), thereby preferably using a side feeder. Subsequently all components of the polypropylene composition, including the polypropylene (PP'), preferably the linear polypropylene (l-PP), or the additive mixture (AM) are passed downstream through the second mixing zone (MZ2). Finally the polypropylene composition is discharged via the die (D).

Preferably, the first mixing zone (MZ1) is longer than the second mixing zone (MZ2). Preferably the length ratio between the first mixing zone (MZ1) to the second mixing zone (MZ2) [mm (MZ1)/mm (MZ2)] is at least 2/1, more preferably 3/1, yet more preferably in the range of 2/1 to 15/1, still more preferably 3/1 to 10/1.

The preparation of the films is accomplished known in the art. For instance the film can be produced by cast film or blown film technology. In the cast film technology the molten polypropylene composition is extruded through a slot extrusion die onto a chill roll to cool the polymer to a solid film. Typically the polypropylene composition is firstly compressed and liquefied in an extruder, it being possible for any additives to be already added to the polymer or introduced at this stage via a masterbatch. The melt is then forced through a flat-film die (slot die), and the extruded film is taken off on one or more take-off rolls, during which it cools and solidifies. It has proven particularly favorable to keep the take-off roll or rolls, by means of which the extruded film is cooled and solidified, at a temperature from 10 to 50° C., preferably from 10 to 40° C., more preferably from 12 to 35° C. The obtained product is an unstretched film which can if desired biaxially stretched.

In the blown film process the polypropylene composition is extruded through an annular die and blown into a tubular film by forming a bubble which is collapsed between nip rollers after solidification. The blown extrusion can be preferably effected at a temperature in the range 160 to 240° C., and cooled by water or preferably by blowing gas (generally air) at a temperature of 10 to 50° C. to provide a frost line height of 0.5 to 8 times the diameter of the die. The blow up ratio should generally be in the range of from 1.5 to 4, such as from 2 to 4, preferably 2.5 to 3.5.

Finally the present invention is also directed the use of the additive mixture (AM) containing a polypropylene (PP'), preferably a linear polypropylene (l-PP), and at least one additive (A) in a polypropylene composition comprising said additive mixture (AM) and a branched polypropylene (b-PP) to reduce the gel index of said polypropylene composition or films made from said polypropylene composition, wherein
(a) the polypropylene composition and/or the branched polypropylene (b-PP) (like the high melt strength polypropylene (PP)) has/have
(a1) a $F_{30}$ melt strength of more than 5.6 cN, like of more than 5.6 to 20.0 cN, more preferably of more than 5.7 cN, still more preferably of 5.7 to 18.0 cN, yet more preferably of 5.7 to 15.0 cN, still yet more preferably of 5.8 to 13.0 cN,
and
(a2) a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s;
(b) the polypropylene (PP'), preferably the linear polypropylene (l-PP), has a melt flow rate $MFR_2$ (230° C.) of 1 to 18 g/10 min, preferably of 3 to 15 g/10 min, more preferably of 4 to 15 g/10 min, yet more preferably of 5 to 13 g/10 min; and
(c) the at least one additive (A) is selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof.

Preferably the reduction of gel index is accomplished in case the polypropylene composition or the film made from the polypropylene composition has an OCS gel index of less than 1,500, preferably of less than 1,000, more preferably in the range of 100 to 1,500, yet more preferably in the range of 150 to 1,000, still more preferably in the range of 200 to 800.

With regard to the individual components and the final polypropylene composition, reference is made to the information provided above.

In the following, the present invention is described in more detail by way of examples.

EXAMPLES

A. Measuring Methods

The following definitions of terms and determination methods apply for the above general description of the invention as well as to the below examples unless otherwise defined.

Comonomer Content in Polypropylene

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of 250 μm and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Propylene-1-butene-copolymers were evaluated at 767 $cm^{-1}$. Quantitative results are obtained based upon reference to the film thickness.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step $MFR_2$ (230° C.) is measured according to ISO 1133 (230° C., 2.16 kg load).

Strain Hardening Factor (SHF)

The strain hardening factor is defined as $$SHF = \frac{\eta_E^+(t, \dot{\epsilon})}{\eta_{LVE}^+(t)} = \frac{\eta_E^+(t, \dot{\epsilon})}{3\eta^+(t)}$$

wherein
$\eta_E^+(t,\dot{\epsilon})$ is the uniaxial extensional viscosity; and $\eta_{LVE}^+(t)$ is three times the time dependent shear viscosity $\eta^+(t)$ in the linear range of deformation.

The determination of the linear viscoelastic envelop in extension $\eta_{LVE}^+(t)$, using IRIS Rheo Hub 2008, required the calculation of the discrete relaxation time spectrum from the storage and loss modulus data (G', G" (ω)). The linear viscoelastic data (G', G" (ω)) is obtained by frequency sweep measurements undertaken at 180° C. for polypropylene or at 140° for polyethylene, on a Anton Paar MCR 300 coupled with 25 mm parallel plates. The underlying calculation principles used for the determination of the discrete relaxation spectrum are described in Baumgärtel M, Winter H H, "Determination of the discrete relaxation and retardation time spectra from dynamic mechanical data", Rheol. Acta 28:511519 (1989) which is incorporated by reference in its entirety.

IRIS RheoHub 2008 expresses the relaxation time spectrum as a sum of N Maxwell modes $$\overset{o}{G}(t) = G_e \cdot \sum_1^N g_i \cdot e^{-\frac{t}{\lambda_i}}$$

wherein $g_i$ and $\lambda_i$ are material parameters and $G_e$ is the equilibrium modulus.

The choice for the maximum number of modes, N used for determination of the discrete relaxation spectrum, is done by using the option "optimum" from IRIS RheoHub 2008. The equilibrium modulus $G_e$ was set at zero. The non-linear fitting used to obtain $\eta_{LVE}^+(t)$ is performed on IRIS Rheo Hub 2008, using the Doi-Edwards model.

The uniaxial extensional viscosity, $\eta_E^+(t, \dot{\epsilon})$ is obtained from uniaxial extensional flow measurements, conducted on an Anton Paar MCR 501 coupled with the Sentmanat extensional fixture (SER-1). The temperature for the uniaxial extensional flow measurements was set at 180° C., applying extension (strain) rates a at ranging from 0.3 s$^{-1}$ to 10 s$^{-1}$ and covering a range of Hencky strain $\epsilon = \ln [(l-l_0)/l_0]$, with $l_0$ being the original and l the actual sample fixation length, from 0.3 to 3.0. Particularly care was taken for the preparation of the samples for extensional flow. The samples were prepared by compression moulding at 230° C. followed by slow cooling to room temperature (forced water or air cooling were not used). This procedure allowed obtaining well shaped samples free of residual stresses. The sample was left for some minutes at the testing temperature to ensure thermal stability (set temperature±0.1° C.), before carrying out the uniaxial extensional flow measurements.

$F_{30}$ Melt Strength and $v_{30}$ Melt Extensibility

The test described herein follows ISO 16790:2005.

The strain hardening behaviour is determined by the method as described in the article "Rheotens-Mastercurves and Drawability of Polymer Melts", M. H. Wagner, Polymer Engineering and Sience, Vol. 36, pages 925 to 935. The content of the document is included by reference. The strain hardening behaviour of polymers is analysed by Rheotens apparatus (product of Göttfert, Siemensstr.2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm) The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec$^2$. The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the $F_{30}$ melt strength and drawability values.

OCS Gel Index

1. Apparatus

The apparatus consists of a laboratory extruder ME 25/5200 V1 with three heating zones, an adapter and a 150 mm broad die. The follow-on unit encompasses a chillroll CR-8, diameter 140 mm, including Haake C40P heating- and cooling device (15 to 90° C.), a line scan camera FS-5/4096 Pixel (dynamical digital converting of gray scale images) and a wind-up unit with automatic tension control up to 10 N.

3. Material-Specific Settings for Film-Manufacturing

The temperature setting for the heating zones at cylinder and die is classified for polypropylene according to MFR-ranges in three groups:

Group 1: MFR-range 0.3-2.0 g/10 min (230° C./2.16 kg), temperatures 220/260/270/280/290° C.

Group 2: MFR-range 2.0-10 g/10 min (230° C./2.16 kg), temperatures 220/230/240/250/260° C.

Group 3: MFR-range 10-33 g/10 min (230° C./2.16 kg), temperatures 200/220/230/240/240° C.

Preset Parameters:

Rotational speed (screw): 30 rpm

Haul-off speed: 3 m/min;

The film thickness is 50 μm

4. Measurement

After fulfilment of the following parameters: In case of similar materials ca. 60 min running-in period, in case of highly diverging materials ca. 120 min.

Goal: Adjustment of a homogenous film at constant melt pressure and melt temperature. The measuring area is standardised at 5 m$^2$. The measurement itself is terminated automatically when the area is accomplished. The report will be printed simultaneously.

5. Analysis

The number of found defects is, referring 1/m$^2$, class-divided according to size and multiplied with the mass factor, adding up to the gelindex.

| Size class 1 | 100-300 μm | mass factor × 0.1 |
| Size class 2 | 301-600 μm | mass factor × 1.0 |
| Size class 3 | 601-1000 μm | mass factor × 5.0 |
| Size class 4 | >1000 μm | mass factor × 10 |

Example

| | |
|---|---|
| 17 defects | size class 1 × 0.1 = 1.7 |
| 5 defects | size class 2 × 1.0 = 5.0 |
| 2 defects | size class 3 × 5.0 = 10.0 |
| 0 defects | size class 4 × 10.0 = 0 |
| | gelindex = 16.7 |

B. Examples

Linear Polypropylene (l-PP)

l-PP1 is a linear propylene homopolymer having a $MFR_2$ (230° C.) of 0.37 g/10 min, a melting temperature Tm of 164° C., a $F_{30}$ melt strength of 68 cN and $v_{30}$ melt extensibility 146 mm/s.

l-PP2 is a linear propylene homopolymer having a $MFR_2$ (230° C.) of 3.48 g/10 min, a melting temperature Tm of 160° C., a $F_{30}$ melt strength of 6.5 cN and $v_{30}$ melt extensibility 160 mm/s.

l-PP3 is a linear propylene homopolymer having a $MFR_2$ (230° C.) of 9.18 g/10 min, a melting temperature Tm of 162° C., a $F_{30}$ melt strength of 3.0 cN and $v_{30}$ melt extensibility 160 mm/s.

Additive Mixtures

The linear polypropylenes l-PP1, l-PP2 and l-PP3 were used to provide additive mixtures containing further additives as a masterbatch for incorporating into a base polymer of branched polypropylene. The additive mixtures each contain 87.50 wt.-% of the respective linear polypropylene, 10.00 wt.-% Irganox B 225 FF (antioxidant), and 2.50 wt.-% Hydrotalcit. A summary of the properties of the resulting additive mixtures 1 to 3 is given in the following table 1:

TABLE 1

Properties of additive mixtures

| | $MFR_2$ [g/10 min] | Linear polypropylene |
|---|---|---|
| Additive mixture 1 | 0.37 | l-PP1 |
| Additive mixture 2 | 3.48 | l-PP2 |
| Additive mixture 3 | 9.18 | l-PP3 |

Inventive Examples IE1 to IE 4 and Comparative Examples CE1 and CE2 l-PP1 was subjected to a reactive extrusion in the presence of butadiene and peroxide as described in the following. Both the butadiene and the peroxide (amounts are indicated in table 3) were pre-mixed with the l-PP1 powder prior to the melt-mixing step in a horizontal mixer with paddle stirrer at a temperature of 65° C., maintaining an average residence time of 15 to 20 minutes. The pre-mixture was transferred under inert atmosphere to a co-rotating twin screw extruder of the type Theyson TSK60 having a barrel diameter of 60 mm and an L/D-ratio of 48 equipped with a high intensity mixing screw having 3 kneading zones and a two-step degassing setup. The melt temperature profile is given in table 2. The screw speed and throughput is indicated in table 3. In the first ¾ of the extruder length the branched polypropylene is produced (b-PP). Subsequently, via a side feeder, i.e. at the last ¼ of the extruder length, an additive mixture as defined in table 1 is fed into the extruder to the produced branched polypropylene (b-PP) The extruded polypropylene composition was discharged and pelletized. From the pellets films have been produced as described above (OCS gel index). The final properties are indicated in table 4.

TABLE 2

Set temperature profile in the extruder

| | Zone | | | | | | |
|---|---|---|---|---|---|---|---|
| | 1 to 6 | 7 | 8 and 9 | 10 and 11 | 12 | 13 | 14 |
| Temperature [° C.] | 240 | 230 | 220 | 230 | 240 | 230 | 220 |

TABLE 3

Process conditions

| | | IE 1 | IE 2 | IE 3 | IE 4 | CE 1 | CE 2 |
|---|---|---|---|---|---|---|---|
| Peroxide* | [wt.-%] | 0.3 | 0.3 | 0.475 | 0.475 | 0.3 | 0.475 |
| butadiene* | [wt.-%] | 0.33 | 0.44 | 0.46 | 0.55 | 0.44 | 0.33 |
| screw speed | [rpm] | 450 | 450 | 450 | 450 | 450 | 450 |
| throughput | [kg/h] | 225 | 225 | 225 | 225 | 225 | 225 |
| additive mixture | [type] | 2 | 3 | 2 | 3 | 1 | 1 |
| additive mixture* | [wt.-%] | 2 | 2 | 2 | 2 | 2 | 2 |

*based on the total amount of the polypropylene composition

TABLE 4

Properties of polypropylene composition

| | $MFR_2$ [g/10 min] | $F_{30}$ [cN] | $v_{30}$ [mm/s] | OCS gel index [—] |
|---|---|---|---|---|
| IE1 | 7.6 | 6.0 | 239 | 663 |
| IE2 | 7.3 | 6.7 | 237 | 332 |
| IE3 | 11.4 | 5.7 | 252 | 1777 |
| IE4 | 9.5 | 7.0 | 250 | 408 |
| CE1 | 4.9 | 9.7 | 237 | 1396 |
| CE2 | 10.4 | 5.1 | 246 | 100674 |

A suitable polypropylene composition having a high melt strength can be prepared by incorporating an additive mixture as a masterbatch into a branched polypropylene. When using a masterbatch (additive mixture) having a higher melt flow rate, the resulting polypropylene composition has a low OCS gel index and, therefore, favorable optical appearance. Additional experiments have shown that the additive mixtures do not effect $MFR_2$, $F_{30}$ and $v_{30}$ values, however very much the OCS gel index to the negative. All examples in which the branched polypropylene has been not mixed with the additive mixtures 1 to 3 showed the same $MFR_2$, $F_{30}$ and $v_{30}$ values.

We claim:

1. A process for providing a polypropylene composition having a high melt strength, the process comprising the steps of:
   (a) providing a branched polypropylene (b-PP) having a $F_{30}$ melt strength of more than 5.5 cN and a $v_{30}$ melt extensibility of more than 200 mm/s, wherein the $F_{30}$ melt strength and the $v_{30}$ melt extensibility are measured according to ISO 16790:2005, wherein the branched polypropylene (b-PP) is provided by reacting a polypropylene (PP) with a thermally decomposing free radical-forming agent and optionally a bifunctionally unsaturated monomer;
   (b) adding to 95 to 99 parts by weight of the branched polypropylene (b-PP) 1 to 5 parts by weight of a linear polypropylene (l-PP) having a melt flow rate $MFR_2$ (230° C.) of 1 to 18 g/10 min.

2. The process according to claim 1, wherein the branched polypropylene (b-PP) is provided by reacting the polypropylene (PP) with a peroxide.

3. The process according to claim 1, wherein step (b) is initiated when at least 80% of the reaction between the polypropylene (PP) and the thermally decomposing free radical-forming agent and optionally the bifunctionally unsaturated monomer has taken place.

4. The process according to claim 1, wherein the step (a) and (b) are accomplished in an extruder, said extruder comprises in operation direction a first mixing zone (MZ1) and a second mixing zone (MZ2), wherein the step (a) takes place in the first mixing zone (MZ1) whereas step (b) takes place in the second mixing zone (MZ2).

5. The process according to claim 4, wherein the extruder comprises in operation direction a feed-throat (FT), the first mixing zone (MZ1), the second mixing zone (MZ2) and a die (D), wherein between the first mixing zone (MZ1) and the second mixing zone (MZ2) a side feed-throat (SFT) is located, wherein the polypropylene (PP), the thermally decomposing free radical-forming agent, and optionally the bifunctionally unsaturated monomer are fed via the feed-throat (FT) and the linear polypropylene (l-PP) is fed via the side feed-throat (SFT).

6. The process according to claim 3, wherein
   (a) the reaction between the polypropylene (PP) and the thermally decomposing free radical-forming agent and optionally the bifunctionally unsaturated monomer takes place in a first mixing zone (MZ1);
   and/or
   (b) not more than 10 wt. % of the total amount of the branched polypropylene (b-PP) is produced in a second mixing zone (MZ2).

7. The process according to claim 1, wherein 1 to 3 parts by weight of the linear polypropylene (l-PP) are added to 97 to 99 parts by weight of the branched polypropylene (b-PP).

8. The process according to claim 1, wherein
   (a) the linear polypropylene (l-PP) comprises at least one additive (A) selected from the group consisting of anti-oxidants, metal deactivators, UV-stabilizers, antistatic agents, antifogging agents, acid scavengers, blowing agents, cling agents, lubricants, nucleating agents, slip agents, antiblocking agents and mixtures thereof,
   and/or
   (b) the branched polypropylene (b-PP) is free of additives (A).

9. The process according to claim 1, wherein the resulting polypropylene composition has
   (a) a $F_{30}$ melt strength of more than 5.5 cN and a $v_{30}$ melt extensibility of more than 200 mm/s, wherein the $F_{30}$ melt strength and the $v_{30}$ melt extensibility are measured according to ISO 16790:2005;
   and/or
   (b) a gel index of less than 1,500.

10. The process according to claim 1, wherein the resulting polypropylene composition comprises
    (a) 95 to 99 parts by weight of the branched polypropylene (b-PP); and
    (b) 1 to 5 parts by weight of the linear polypropylene (l-PP) having a melt flow rate $MFR_2$ (230° C.) measured according to ISO 1133 of 3 to 15 g/10 min,
    wherein the polypropylene composition has
    a melt flow rate $MFR_2$ (230° C.) measured according to ISO 1133 of 8 to 13 g/10 min, and
    a gel index of less than 1,500;
    and wherein the polypropylene composition and/or the branched polypropylene (b-PP) has/have
    a $F_{30}$ melt strength of 5.8 to 13.0 cN, and
    a $v_{30}$ melt extensibility of 230 to 290 mm/s,
    wherein the $F_{30}$ melt strength and the $v_{30}$ melt extensibility are measured according to ISO 16790:2005.

11. The process according to claim 1, wherein the polypropylene composition and/or the branched polypropylene (b-PP) has/have a strain hardening factor (SHF) of at least 1.9, measured at a strain rate of $3.0\,s^{-1}$ and a Hencky strain of 2.5.

12. The process according to claim 1, wherein the linear polypropylene (l-PP) has a melt flow rate $MFR_2$ (230° C.) of 3 to 15 g/10 min.

13. The process according to claim 1, wherein the branched polypropylene (b-PP) is provided by reacting the polypropylene (PP) with a peroxide, and optionally with a bifunctionally unsaturated monomer selected from the group consisting of divinyl compounds, allyl compounds and dienes.

14. A polypropylene composition having a high melt strength, comprising:
    a) 95 to 99 parts by weight of a branched polypropylene (b-PP) provided by reacting a polypropylene (PP) with a thermally decomposing free radical forming agent; and
    (b) 1 to 5 parts by weight of a linear polypropylene (l-PP) having a melt flow rate $MFR_2$ (230° C.) measured according to ISO 1133 of 1 to 18 g/10 min;
    wherein the polypropylene composition has
    a melt flow rate $MFR_2$ (230° C.) measured according to ISO 1133 of 8 to 13 g/10 min, and
    a gel index of less than 1,500;
    and wherein the branched polypropylene (b-PP) has
    a $F_{30}$ melt strength of more than 5.5 cN, and
    a $v_{30}$ melt extensibility of more than 200 mm/s,
    wherein the $F_{30}$ melt strength and the $v_{30}$ melt extensibility are measured according to ISO 16790:2005.

15. The polypropylene composition according to claim 14, wherein the polypropylene composition comprises at least one additive (A) selected from the group consisting of anti-oxidants, metal deactivators, UV-stabilizers, antistatic agents, antifogging agents, acid scavengers, blowing agents, cling agents, lubricants, nucleating agents, slip agents, antiblocking agents and mixtures thereof.

16. A film comprising the polypropylene composition according to claim claim 14.

17. A polypropylene composition having a high melt strength, comprising:
    (a) 95 to 99 parts by weight of a branched polypropylene (b-PP) provided by reacting a polypropylene (PP) with a thermally decomposing free radical forming agent; and
    (b) 1 to 5 parts by weight of a linear polypropylene (l-PP) having a melt flow rate $MFR_2$ (230° C.) measured according to ISO 1133 of from 3 to 15 g/10 min;

wherein the polypropylene composition has
a melt flow rate $MFR_2$ (230° C.) measured according to ISO 1133 of 4 to below 8 g/10 min, and
a gel index of less than 1,300;
and wherein the branched polypropylene (b-PP) has
a $F_{30}$ melt strength of more than 5.5 cN, and
a $v_{30}$ melt extensibility of more than 200 mm/s, wherein the $F_{30}$ melt strength and the $v_{30}$ melt extensibility are measured according to ISO 16790:2005.

18. A process for providing a polypropylene composition having a high melt strength, the process comprising the steps of:
(a) providing a branched polypropylene (b-PP) having a $F_{30}$ melt strength of more than 5.5 cN and a $v_{30}$ melt extensibility of more than 200 mm/s, wherein the $F_{30}$ melt strength and the $v_{30}$ melt extensibility are measured according to ISO 16790:2005, wherein the branched polypropylene (b-PP) is provided by reacting a polypropylene (PP) with a thermally decomposing free radical-forming agent;
(b) providing a linear polypropylene (l-PP) having a melt flow rate $MFR_2$ (230° C.) measured according to ISO 1133 of 1 to 18 g/10 min,
(c) formulating the polypropylene composition by adding an additive mixture (AM) containing the linear polypropylene (l-PP) of step (b) and at least one additive (A) to the branched polypropylene (b-PP) of step (a), wherein the at least one additive (A) is selected from the group consisting of antioxidants, metal deactivators, UV-stabilizers, antistatic agents, antifogging agents, acid scavengers, blowing agents, cling agents, lubricants, nucleating agents, slip agents, antiblocking agents and mixtures thereof, and
wherein the polypropylene composition comprises 95 to 99 parts by weight of the branched polypropylene (b-PP) and 1 to 5 parts by weight of the linear polypropylene (l-PP), and wherein the gel index of said polypropylene composition or films made from said polypropylene composition are reduced.

19. The process according to claim 18, wherein the reduction of gel index is accomplished in case the polypropylene composition or the film made from the polypropylene composition has a gel index of less than 1,500.

20. The process according to claim 18, wherein the polypropylene composition comprises
1 to 5 parts by weight of the linear polypropylene (l-PP) having a melt flow rate $MFR_2$ (230° C.) measured according to ISO 1133 of 3 to 15 g/10 min;
wherein the polypropylene composition has
a melt flow rate $MFR_2$ (230° C.) measured according to ISO 1133 of 4 to below 8 g/10 min, and
a gel index of less than 1,300;
and wherein the polypropylene composition and/or the branched polypropylene (b-PP) has/have
a $F_{30}$ melt strength of more than 6.0 to 13.0 cN, and
a $v_{30}$ melt extensibility of 230 to 290 mm/s, wherein the $F_{30}$ melt strength and the $v_{30}$ melt extensibility are measured according to ISO 16790:2005.

* * * * *